United States Patent [19]
Westervelt et al.

[11] 3,967,343
[45] July 6, 1976

[54] ANIMAL HOLD DOWN/NECK STRETCHER FOR KOSHER SLAUGHTER ON A DOUBLE-RAIL ANIMAL SUPPORT SYSTEM

[75] Inventors: Rudy G. Westervelt, Newfield, N.Y.; Walter Giger, Jr., Wethersfield, Conn.

[73] Assignee: Council of Livestock Protection, Inc., New York, N.Y.

[22] Filed: Oct. 1, 1975

[21] Appl. No.: 618,463

[52] U.S. Cl. .................................... 17/1 A; 119/96
[51] Int. Cl.² ............................................. A22B 5/02
[58] Field of Search ................... 17/1 A, 44, 24; 119/158, 96

[56] References Cited
UNITED STATES PATENTS
3,292,206  12/1966  Aubert ............................. 17/1 A

*Primary Examiner*—Hugh R. Chamblee
*Attorney, Agent, or Firm*—Moonray Kojima

[57] ABSTRACT

A frame used to hold down and restrain an animal positioned upright with its legs straddling a conveyor and to stretch its neck for ritual slaughter. The frame comprises a body part having two outer parallel bars and two inner parallel bars interconnected at their ends by semi-circular shaped cross bars such that the body part would suitably fit over the back of an animal to be slaughtered. The body part has outwardly disposed to the side, pivots to engage slots in side walls for holding the frame and the animal unto the rail during the travel down the conveyor. Connected to the body part at a suitable angle is a neck portion having a pair of bars extending upward from the body part and at an angle and a pair of resilient strips between which the neck of the animal may be placed and held and at the end of the bar a circularly shaped jaw holder arranged to hold the animal's neck stretched and stable.

1 Claim, 5 Drawing Figures

ANIMAL HOLD DOWN/NECK STRETCHER FOR KOSHER SLAUGHTER ON A DOUBLE-RAIL ANIMAL SUPPORT SYSTEM

This invention relates to a frame for restraining the body and stretching the neck of an animal to be slaughtered.

In copending application Giger, Westervelt Ser. No. 618,468 filed concurrently herewith and assigned to the same assignee hereof, there is disclosed a double rail conveyor system on which an animal is placed upright with its legs straddling the conveyor. The present invention may be used to hold down the animal on the conveyor and to stretch its neck and keep same stable for ritual slaughter.

Briefly, the invention encompasses a body portion and a neck stretcher portion. The body portion comprises a pair of parallel inner bars and a pair of parallel outer bars held at its ends by semi-circularly shaped cross bars such that the frame will fit over the back of the animal. Connected to the outer bars on each side are extensions which may fit into slots of stationary walls located on either side of the animal and thus stably and movably hold the frame on the animal and the animal on the conveyor. Connected to the body part are two bars extending at an angle. Connected to and between the bars is a strip which has two radially positioned head positions suitably distanced to hold the upper neck of the animal. At the end of the bar is a semi-circular shaped perpendicularly positioned bar which is positioned to fit under the jaws of the animal and thus stretch the neck and hold same quietly for ritual slaughter.

The invention will now be further illustrated with reference to the drawing, in which.

Figure 1:
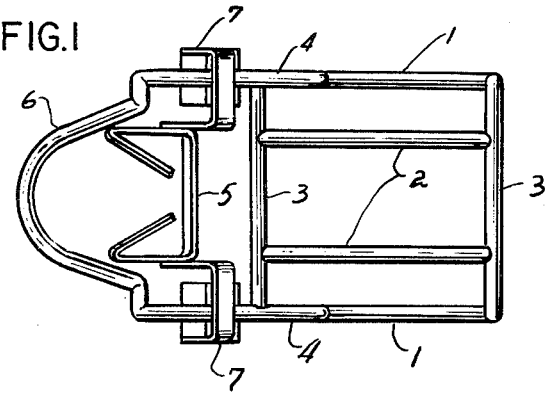
FIG. 1 depicts a top view of an illustrative embodiment.
Figure 2:
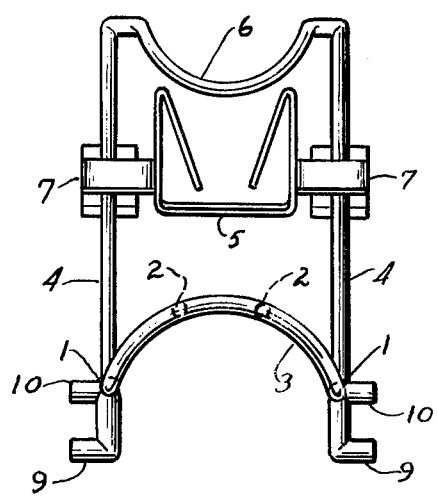
FIG. 2, depicts an end view of the embodiment.
Figure 3:
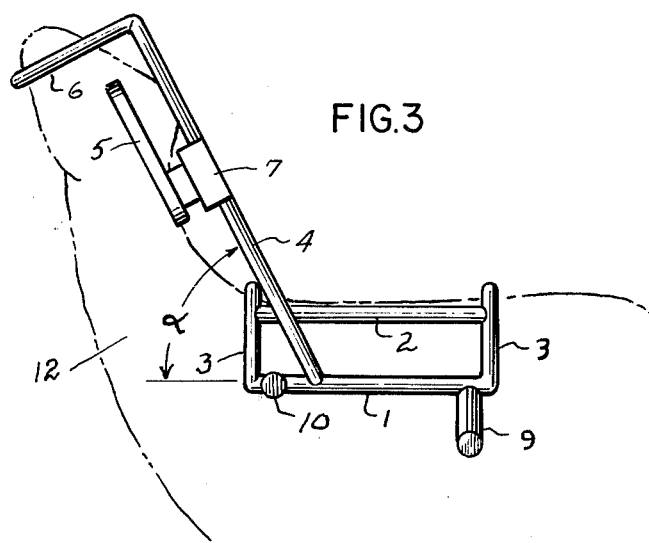
FIG. 3 depicts a side view of the embodiment as used on an animal.

Turning now to FIGS. 1, 2 and 3, body frame part comprises parallel outer bars 1, parallel inner bars 2 interconnected by semi-circular shaped cross bars 3. Connected to both outer bars 1 are extensions 9 and 10 which may engage slots in stationary walls between which the conveyor on which the animal may be carried, is located. By suitable placement of the slots, the frame and body may be maneuvered as desired. Connected to frame bar 1 at an angle alpha, which may be for some applications 63°, are two bars 4 to which neck restraining means 5 may be attached by connector 7. The flat spring 5 secures the head beneath the ears and adjusts to the size of the head. The upright 7 also enables the strip 5 to adjust to different neck lengths. The restrainer may be the steel strip 5 shaped as depicted and having a resilient bent portion for securing the upper neck of the animal, as depicted in FIG. 3. At the end of bar 4 is a suitably semi-circularly shaped bar which is connected perpendicularly to the bar 4 as depicted in FIG. 3 and is suitably positioned to fit under the jaws of the animal 12.

Figure 4:
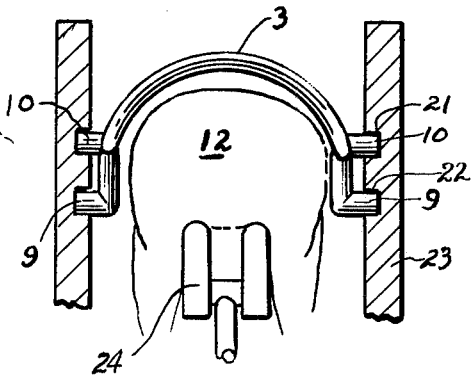
FIG. 4 depicts an end view of the frame used on an animal and having pivot extensions disposed in slots in a wall.
Figure 5:
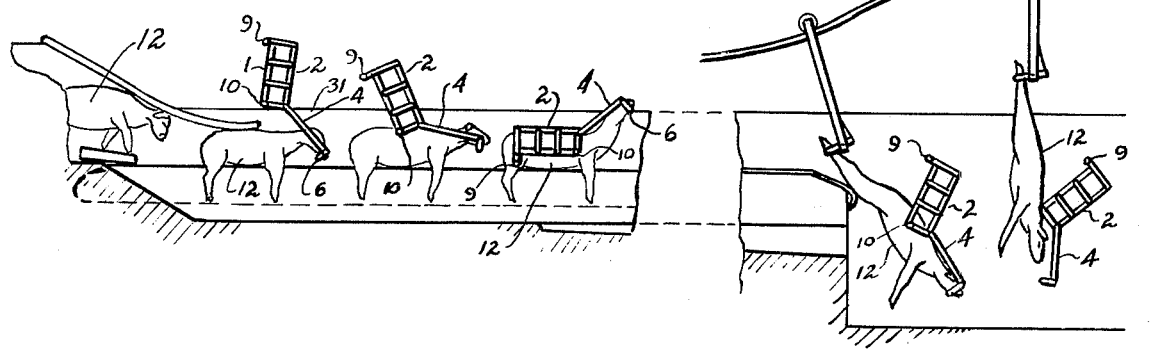
FIG. 5 depicts a sequence of operation for placing the frame on the animal and removing same.

Thus, as shown in FIGS. 4 and 5, in a typical situation, the frame will come down from a holder such as guide 31 and catch the jaw of the animal with bar 6, and as the animal travels from the left on the conveyor 24, the body frame portion will then come down (being led by extensions 9 and 10 positioned suitably in slots 22, 22 of walls 23) as depicted in FIG. 4, and fit securely over the back of animal 12. After slaughter, the side wall slots will veer off or terminate and the frame will come off as the animal is hoisted up as shown in FIG. 5.

The dimensions of the various parts of the frame can be suitably adjusted for different animals. Similarly, instead of extensions 9 and 10 held by slots in a wall 23, other suitable holder and guide means can be used to guide and hold the frame. FIG. 5 shows one example and other arrangements can be used. In FIG. 5, the animal 12 is led onto double rail conveyor 24 in a standing position with its legs straddling the rails 24. From an overhead or other guide 31, the frame is lowered onto the back of the animal 12 with the jaw holder 6 catching the jaw and the back portion frame going onto the back of the animal. Because the jaw holder bars 4 are at an angle, the neck is stretched. The guide extensions 9 and 10 are in suitable slot guides (such as shown in FIG. 4 as 24) located in the side walls 23 and hold the frame on the animal's back securely while stretching the neck and holding same in stability. As shown, after the animal is slaughtered, it can be shackled and hoisted at the end of the conveyor. The frame may then be discarded as shown in FIG. 5 at the same time since the extensions 9 and 10 are no longer in the slotted guides and gravity may pull down the frame since the jaw holder is below the jaw.

The foregoing description illustrates the principles of the invention. Numerous other variations and modifications thereof would be apparent to the worker skilled in the art. All such variations are to be considered to be within the spirit and scope of the invention.

What is claimed is:

1. A neck stretching and body restraining frame, comprising a pair of parallel inner bars;

a pair of parallel outer bars;

a circularly shaped cross bar interconnecting said inner and outer bars;

a pair of parallel holding bars extending at an angle from one end of said interconnected outer bars;

a jaw holder means comprising a circularly shaped extension connected to the unconnected ends of said parallel holding bars and extending perpendicular thereto in a direction opposite said inner and outer bars;

a neck restraining means comprising flexible double strips connected between said parallel holding bars and located between said extensions and said outer bars and being sufficiently spaced to hold the neck of an animal; and outwardly extending bearing connected to said outer bars for movably holding said frame on the back of said animal.

* * * * *